United States Patent [19]

Besprozvanny et al.

[11] Patent Number: 5,627,523

[45] Date of Patent: May 6, 1997

[54] LIQUID LEVEL SENSOR DEVICE

[75] Inventors: Leonid R. Besprozvanny, San Marcos, Calif.; Alan R. Ball, Gilbert, Ariz.

[73] Assignee: Power Paragon Inc., Anaheim, Calif.

[21] Appl. No.: 657,369

[22] Filed: Jun. 3, 1996

[51] Int. Cl.$^6$ .................................................. G08B 21/00
[52] U.S. Cl. ........................ 340/623; 340/612; 340/618; 340/624; 73/290 R; 73/304 R; 73/308; 73/313
[58] Field of Search .................................. 340/623, 618, 340/624, 612; 73/290 R, 305, 304, 306, 307, 308, 313; 116/109, 110

[56] References Cited

U.S. PATENT DOCUMENTS

| | | | |
|---|---|---|---|
| 4,384,184 | 5/1983 | Alvarez | 200/84 C |
| 4,976,146 | 12/1990 | Senghaas et al. | 73/313 |
| 5,146,785 | 9/1992 | Riley | 73/313 |
| 5,275,044 | 1/1994 | Riley | 73/313 |
| 5,347,864 | 9/1994 | Senghaas et al. | 73/313 |

Primary Examiner—Thomas Mullen
Assistant Examiner—Davetta C. Woods
Attorney, Agent, or Firm—Monty Koslover

[57] ABSTRACT

A liquid level sensor device, particularly adapted for use with corrosive and hazardous liquids such as oil, for measuring the liquid level in a storage tank or vessel. A tubular device is placed vertically in a liquid storage tank and senses the liquid level by having a float embedded with magnets move vertically along the axis of reed switches encased in the tubular device. The device contains temperature sensors to measure the temperature of the tank fluid, and microprocessors that scan the reed switches, transmitting data through a connector in the device top to a nearby computer for recording and transmission to a control and monitoring location. The electrical data system inside the device utilizes only two conductive trace runs throughout the device length to maximize reliability while minimizing the copper used. Special mechanical and electrical assembly connectors inside the device permit the device to flex safely in turbulent liquid conditions, without breakage.

16 Claims, 4 Drawing Sheets

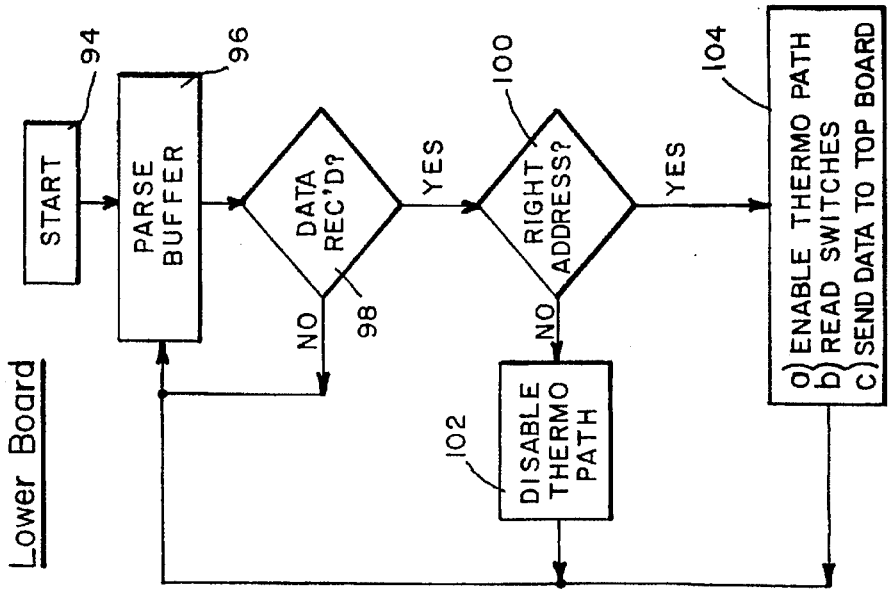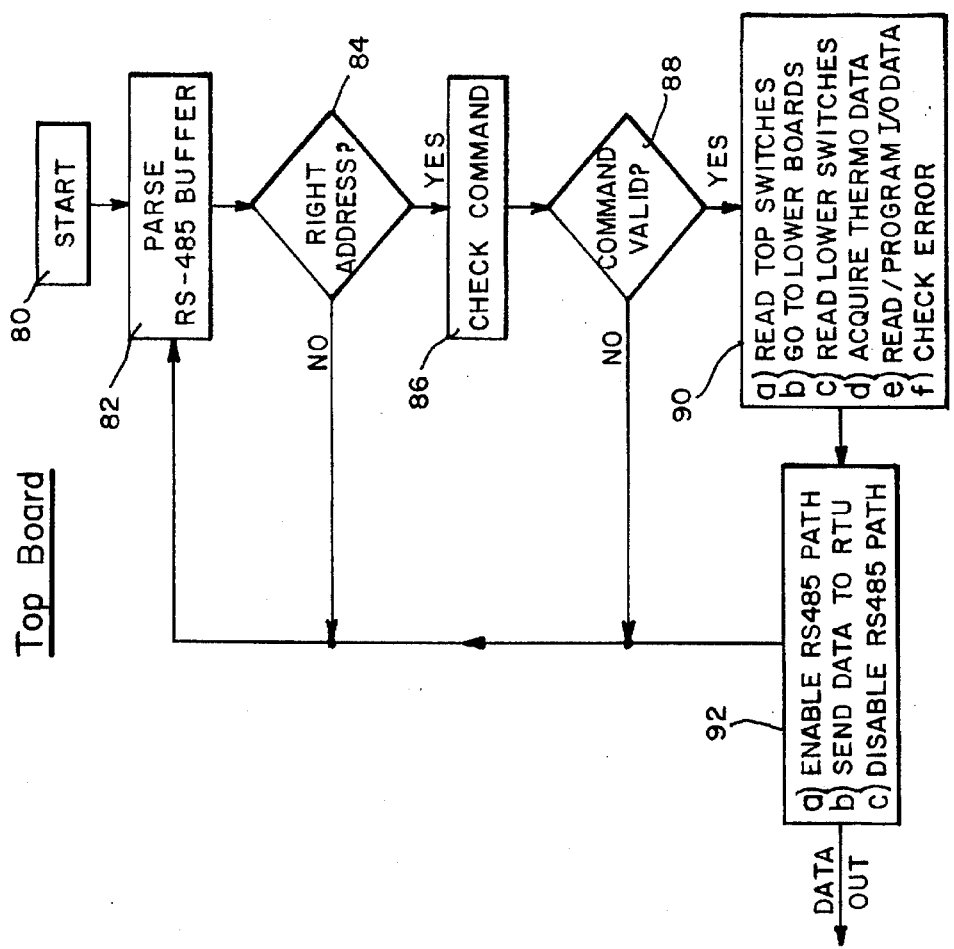

LIQUID LEVEL SENSOR DEVICE

BACKGROUND OF THE INVENTION

1. Field of the Invention

This invention relates to liquid level sensors and more particularly, to a liquid level sensor device adapted for use in a storage tank having a hazardous and explosive environment.

2. Background

Many industrial fluids are stored in large tanks prior to their distribution for use. It is often necessary to know the fill status of the fluids in the tanks, and for this purpose, liquid level sensors inserted into the tanks are used.

The presently available liquid level sensor devices for industrial, fluid storage utilize electrical assemblies that are contained in one or more sealed tubes, and have a variety of external float mechanisms to activate switches on the electrical assemblies. The status of these switches and therefore, the liquid level, is communicated by wire from the top of the sensor device to any desired monitoring location.

A typical use for these sensors is in the oil tanks and water tanks located near an oil well head. The sensors measure the levels of oil or water in the tanks deposited by the pump at the well head, and transmit the liquid level data to a local or remote monitoring unit.

While the presently available liquid level sensor devices generally perform adequately, they are known to have serious disadvantages and potential problem areas as a consequence of their physical and electronic data system mechanizations.

Since a sensor device usually is located in a turbulent environment inside a liquid storage tank, liquid movement in the vessel impinges on the device, creating substantial flexing of the device tube and the electrical assemblies inside the tube. In the prior art devices, the electrical assemblies on which are mounted sense switches, are generally arranged and joined end to end, with wire connectors and often switches connected across the assembly board ends. After a time, breakage of internal electrical components is observed near or at assembly joints. The device then has to be repaired or replaced by another, which is usually an expensive, time consuming procedure.

Many electrical conductive traces are typically used in the prior art devices to connect and address the switches on the electrical assemblies. As an example, in U.S. Pat. No. 4,976,146, the liquid level sensor utilizes 31 traces to run from the bottom of the unit to its top assembly. This large number of traces requires large connectors and greatly reduces the reliability of the device, increasing connection/connector complexity and the probability of electrical failures.

An additional problem area concerns detection of failed sensor switches inside the device. As yet, none of the prior art available liquid level sensor devices is known to incorporate a satisfactory method of determining which sensor switches have failed. The accuracy and reliability of the liquid level detection is then compromised.

Thus, there exists a need for a liquid level sensor device that can withstand a turbulent liquid environment without internal breakage and has high measurement accuracy and reliability of operation.

SUMMARY OF THE INVENTION

The invention is a liquid level sensing device, particularly adapted for use in an explosive, hazardous environment. The relative position of liquid level, from full to empty is measured by having a float embedded with magnets move up or down along the axis of two staggered lines of reed switches encased in a tube. Inside the tube, are contained a number of sensor circuit board assemblies, which are connected mechanically and electrically from the top to the bottom of the tube. In addition to the two lines of reed switches and supporting circuitry, each circuit board assembly has its own microprocessor that scans and reports on the status of the reed switches. The topmost board assembly contains a master control microprocessor which addresses each of the sensor circuit board assemblies and communicates the data over an RS-485 serial communication bus to an external computer. The device incorporates a program for automatically scanning and determining which if any reed switches have failed, and reporting them for repair. Only two electrical conduction traces are used throughout to maximize contact reliability and also to reduce the amount of copper as compared with that needed for a parallel bus.

The device incorporates mechanical and electrical connections for the circuit board assemblies which allow the tube and its internal assemblies to flex in a turbulent liquid without breakage of electrical components or contacts.

The material used for the tube and float is selected for its ability to endure harsh environments, particularly that found at oil well sites.

The device may be used with continual level sense switches from top to bottom, or with level sense switches only near the device top and bottom, without requiring any change to the device microprocessor programming.

Accordingly, it is a principal object of this invention to provide a liquid level sensor that can withstand a turbulent liquid environment without internal device breakage.

Another object is to provide a highly reliable liquid level sensor.

Yet another object is to provide a liquid level sensor that incorporates a new, accurate method of liquid level detection which also detects faulty sensor switches for repair or replacement.

Further objects and advantages of the invention will be apparent from studying the following portion of the specification, the claims and the attached drawings.

BRIEF DESCRIPTION OF THE DRAWINGS

FIG. 10 is a process flow chart of the liquid level sense data collection system that operates in the top sensor circuit board assembly, and useful in explaining how the liquid level sensor operates; and FIG. 11 is a process flow chart of the liquid level data collection system that operates in a typical lower sensor circuit board assembly.

DESCRIPTION OF THE PREFERRED EMBODIMENT

Figure 1:
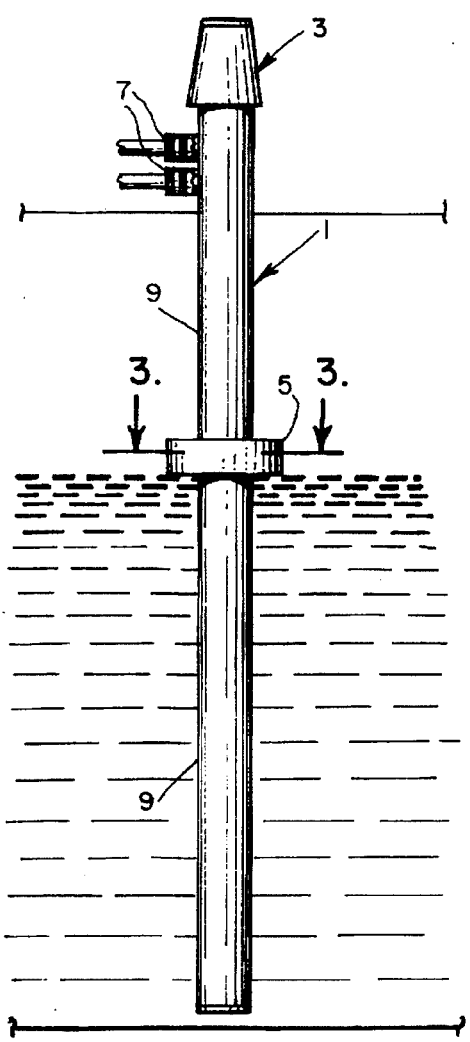
FIG. 1 is a front perspective view of the invention liquid level sensor device, particularly showing the device installed vertically in a vessel which contains liquid, with the top of the device above the top of the vessel.

Referring particularly to the drawings, there is shown in FIG. 1 a perspective view of a liquid level sensor device 1 according to the present, invention. The device 1 is shown in place vertically in a vessel of liquid with the device top cover 3 and data transmission terminals 7 protruding above the top of the vessel, and a tube 9 containing rows of sense switches, extending to the bottom of the vessel. The tube 9 is attached to the vessel with standard mounting and sealing methods.

The purpose of the liquid level sensor device 1 is to indicate the relative position of the liquid level by having a float 5, embedded with magnets, move up or down along the axis of reed switches encased in a tube 9. The proximity of the float to any of the reed switches causes those reed switches to close contacts, indicating the position of the float and thus, the level of the liquid in the vessel.

The bottom of the tube 9 is expected to sit at "Level 0 inches" of the fluid to be measured, which is at the bottom of the vessel.

Once scanned, along with liquid temperature information, the data is sent across an RS-485 serial computer communication bus, through terminals 7 at the top of the device 1 to a computer located nearby.

Figure 2:
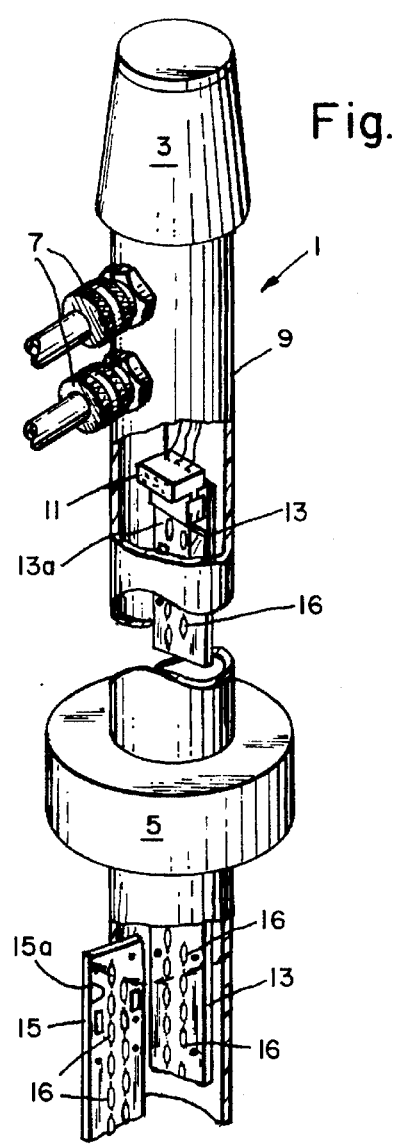
FIG. 2 is a perspective view of the invention liquid level sensor device, with parts of the device cut away to show the arrangement of sensing circuit board assemblies contained inside.
Figure 3:
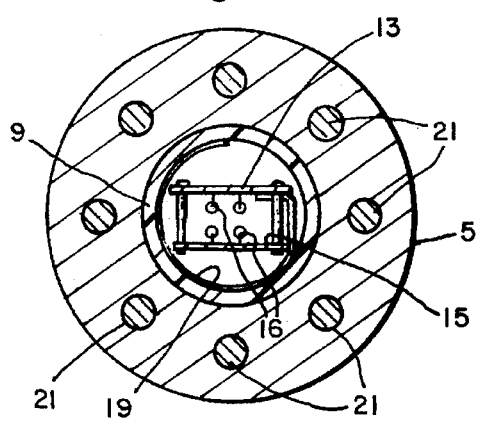
FIG. 3 is a cross-section view of the device taken through the float along line 3—3 of FIG. 1, particularly showing the typical locations of magnetic material embedded in the float.
Figure 3:
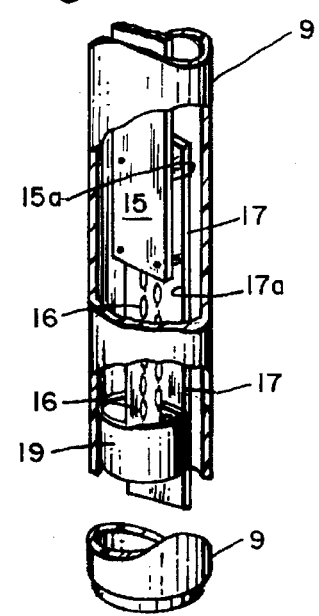

Refer now to FIGS. 2 and 3 which are respectively, a cutaway perspective view of the invention device, and a plan view taken along line 3—3 of FIG. 1, showing a cross-section of the float 5. The device comprises a tube 9 sealed at its bottom end, a cap 3 which screws on the top of the tube 9, a float 5 which fits around 1 he tube 9, external wiring terminals 7, and a quantity of circuit board assemblies connected together inside the tube 9.

Inside the tube 9 are two types of circuit board assemblies; a top sensor circuit board assembly 13 and one or more lower sensor circuit board assemblies 15, 17. The quantity of the lower sensor circuit board assemblies depends on the height of the vessel containing the liquid whose level is to be measured. The top sensor circuit board assembly 13 is the control board. In addition to scanning its own reed switches 16 which are shown on its inside surface 13a, the top assembly processes configuration data, is responsible for power conditioning and distribution to all the sensor circuit board assemblies, and for communication with outside computers through an RS-485 serial computer-communications port. A connector 11 connects the top sensor circuit board assembly to the external transmission wires.

The lower sensor circuit board assemblies 15, 17, are identical, each containing processor circuitry to scan its own sensor reed switches 16 and any temperature sense device 19 placed on the assembly. Part of a lower sensor circuit board 15 has been folded outward to display a view of its inward facing surface 15a showing placement of controls and sensor reed switches 16.

Usually, the sensing circuit board assemblies extend to the bottom of the tube 9 and, depending on the depth of the liquid container vessel, may require numerous lower sensing circuit board assemblies connected end to end to reach the bottom or the tube. However, this is not a necessity for the device to operate. The user may need to have only bottom and top level portions of the vessel monitored. In that case, only enough lower sensing circuit board assemblies would be provided to cover the needed bottom and top level portions. Blank boards could be used, connecting the bottom board assemblies to the top board assembly. Considerable cost is saved thereby.

The tube 9 and cap 3 are made of fiberglass material to withstand a corrosive crude-oil environment. The float 5 is made of Nitrile rubber to withstand a crude-oil environment, and has magnets 21 embedded in it, either in stud-magnet as shown in FIG. 3 or ring-magnet form. The external terminals 7 are standard, insulated wire grippers screwed into the side of the fiberglass tube 9, serving to secure the transmission wires to the sensor device 9.

Figure 4:
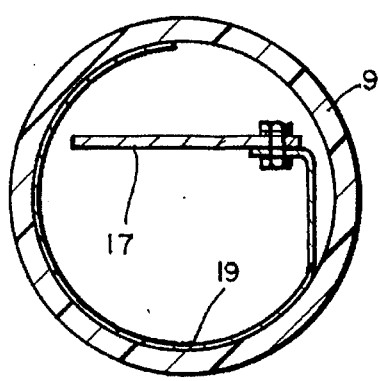
FIG. 4 is a cross-section view of a portion of the device tube, particularly showing one of the temperature sensors that are mounted to the circuit board assemblies.

Refer now to FIG. 4 which is a cross-section of the tube 9 showing a temperature sensor 19 attached to a lower sensor circuit board assembly 17. A temperature sensor 19 is shown near the bottom of FIG. 2 in the cut away front view. The temperature sensor 19 is a coiled strip of high thermal conductivity metal, such as copper, which presses against the inside wall of the tube 9. It provides a conduction path for the inside tube wall and hence the surrounding liquid temperature, to a temperature monitoring circuit mounted on the board assembly. The sensed temperature is processed by the microprocessor on the top sensor circuit board.

Figure 7:
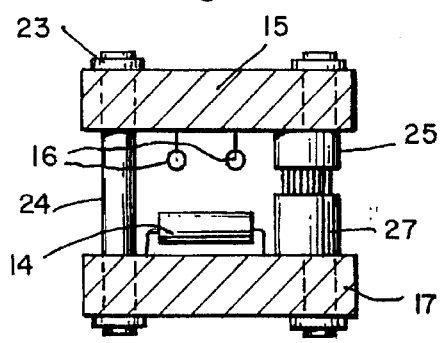
FIG. 7 is a top end view of two sensor circuit board assemblies, looking down on the top end of FIG. 5 and illustrating assembly mechanical and electrical connections.
Figure 5:
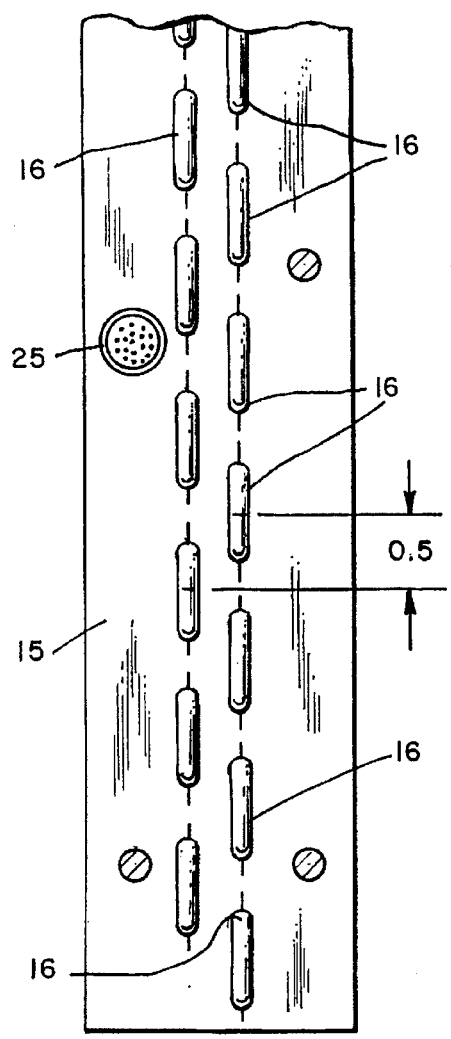
FIG. 5 is a view of part of a typical sensor circuit board assembly taken along line 5—5 of FIG. 6, and particularly showing the placement of two staggered lines of reed switches that run along most of the length of the board assembly.
Figure 6:
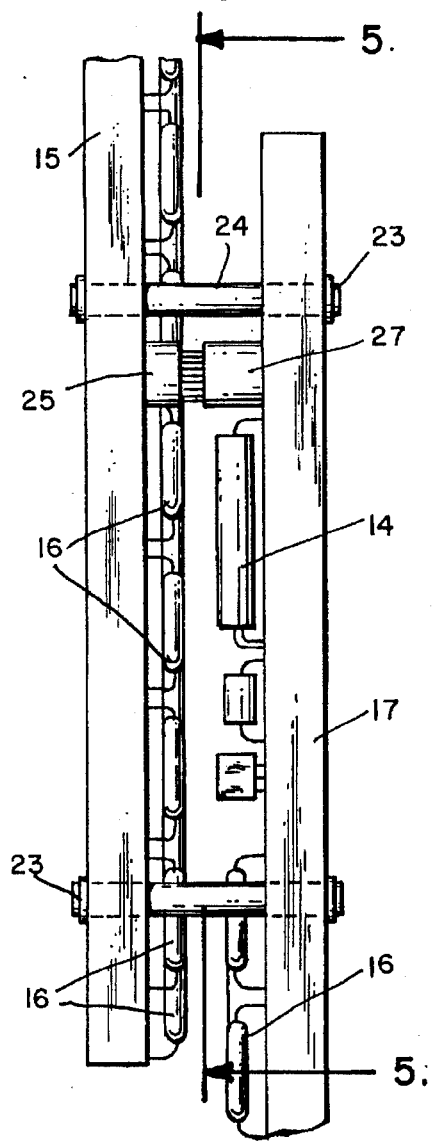
FIG. 6 is a side elevation view of cut away parts of two sensor circuit board assemblies, particularly showing how the two assemblies are mechanically and electrically connected.

Referring now to FIGS. 5, 6 and 7, these drawings illustrate the mechanical and electrical connections made between the circuit board assemblies, also showing the location of a microprocessor 14 and some of the other control circuit components. The drawings depict typical lines of reed switches 16, which are shown in this case, on one of the lower sensor circuit board assemblies 15. All the sensor circuit board assemblies have two lines of reed switches 16 or other magnetically sensitive switches on them in addition to various electronic control components. The locations of the reed switches are staggered with switches in one line overlapping switches in the other line. For accuracy of measurement, it is essential that the distance between centers of any two switches, located staggered side by side on the two lines, is kept at approximately 0.5 inches.

The board assemblies are fastened to each other at overlapping ends using three threaded pins 23 which pass through cylindrical electrical insulator spacers 24 used to keep the board assemblies the correct distance apart. This arrangement keeps the joined portions rigid, so that they can not bend. It should be noted on FIGS. 5 and 6 that the lines of sensor reed switches on each board assembly are extended until the end of the lines of switches on one board overlaps the lines of switches on the opposite, joined board. Thus, the switches can detect the liquid level without a blank space at the assembly joint.

The electrical connection between boards is made using plug 25 and receptacle 27 connectors which make a good connection and allow easy disconnection of the boards for maintenance or repair. The connectors 25,27 are located in the area of the boards held rigidly apart by the three sets of screws 23 and spacers 24, near to one of the screws 23 and spacers 24. This ensures that the connectors will not bend during any flexing of the boards.

It has been determined, that the above described type of electrical and mechanical connection, greatly diminishes the probability of electrical component or contact breakage on any circuit board assembly during moderate bending. This characteristic results in a considerable reliability advantage for the invention device, compared with prior art liquid level sensor devices which are more likely to experience electrical component breakage due to bending.

In addition to having a microprocessor for local control on each sensor circuit board assembly, two staggered lines of reed switches are arranged along the board length to correspond with a given liquid level. The microprocessor on the top sensor circuit board assembly acts as a master controller for the liquid level sensor device. It performs the function of periodically obtaining reed switch status data from all the lower sensor circuit boards, including its own circuit board assembly, and transmitting the data to an external computer.

Figure 8:
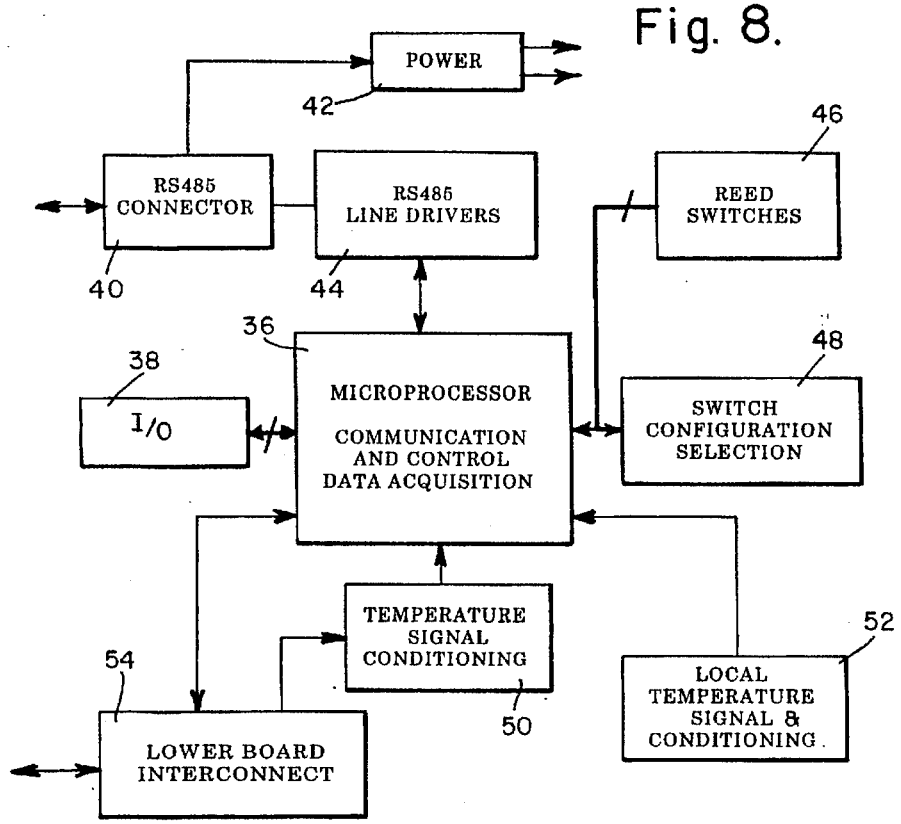
FIG. 8 is a functional block diagram of the major components located on the top sensor circuit board assembly.

Refer now to FIGS. 8 and 10 for the top sensor circuit board assembly, showing a functional block diagram of the components on the board, and a simplified flow chart of the operation of the master microcontroller 36. The major components on the top sensor circuit board assembly are: a microprocessor 36 that acts as a master control, controlling data acquisition on all circuit board assemblies in the device and handling communication with an external monitor; an I/O bus 38 connected to the microprocessor 36; an RS-485 connector interface 40 connected to the RS-485 line drivers 44 and thence to the microprocessor; a power supply 42 for all board components, connected to the RS-485 connector interface; and the following components, all of which are connected to the microprocessor 36: a matrix array of reed switches 46 for sensing the liquid level; a switch configuration selection circuit 48; a local temperature signal and conditioning circuit 52, a temperature signal conditioning circuit 50 for lower board assembly signals, and an interconnect 54 for connecting signals to and from a lower sensor circuit board assembly.

The master control microprocessor 36 is programed to periodically and automatically address all sensor circuit board assemblies as shown in the flow chart of FIG. 10. After Start 80, the RS-485 buffer is parsed 82 and checked for the correct address 84. If the address is incorrect, the buffer is parsed again. If it is correct, the command is checked 86. The command validity 88 is next checked. If not, the buffer is parsed again 8. If OK, the microprocessor proceeds with the following steps 90:

a) Read top sensor board reed switch matrix;

b) Go to lower sensor boards in turn, c) Read switch matrix on each sensor board and d) Acquire thermal sense data;

e) Read/program I/O data;

f) Check for data errors.

When this is done, the microprocessor then 92 a) enables the RS-485 path, b) transmits the data to an external remote terminal unit (RTU), and then c) disables the RS-485 path.

The particular microprocessor software for the top and lower sensor circuit boards that directs the microprocessor to perform the foregoing and other steps, is considered to be integral with and a vital part of this invention. A separate patent application for this software, referencing this invention, is being filed at the earliest date.

Figure 9:
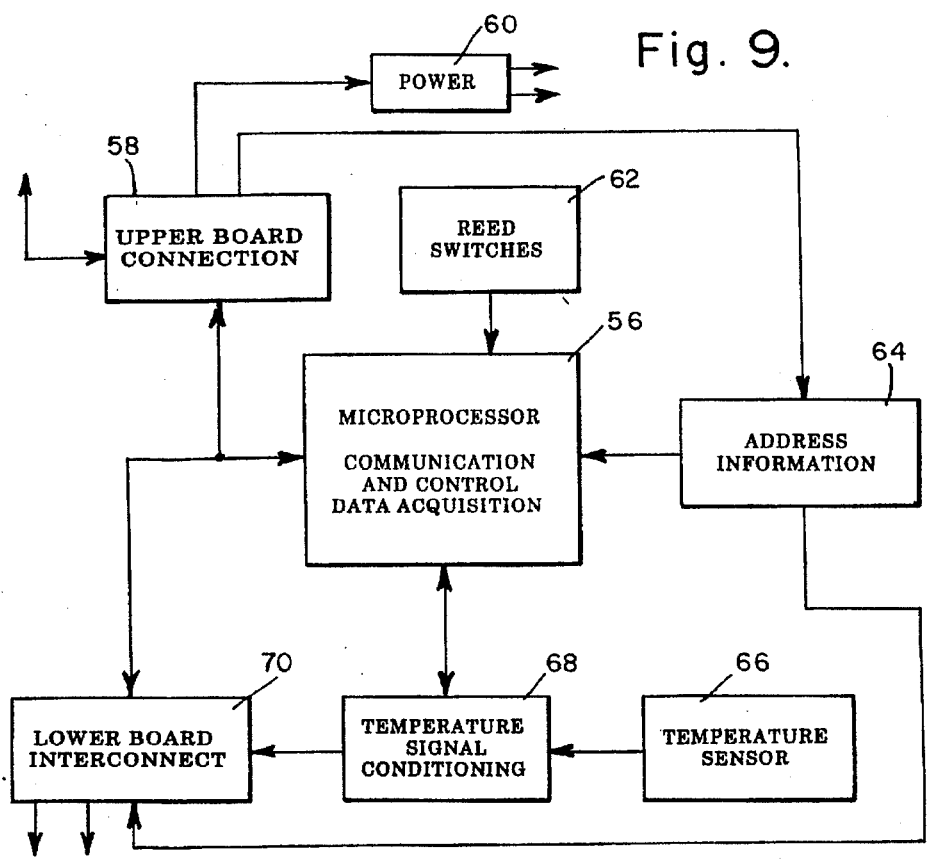
FIG. 9 is a functional block diagram of the major components located on a typical lower sensor circuit board assembly.

Refer now to FIGS. 9 and 11 for a lower sensor circuit board assembly, showing a functional block diagram of the components on the board, and a simplified flow chart of the operation of the local microcontroller 56. The major components of each lower sensor circuit board assembly are: a local microprocessor 56 that initiates and collects sensor switch data, an upper board connector interface 58 connected to the local microprocessor 56, a power supply 60 for all board components, connected to the upper board connector interface 58, and the following components, all connected to the microprocessor 56: a matrix array of reed switches 62 for sensing the liquid level, an automatic addressing circuit 64 having an input from the upper board interface 58, a local temperature signal and conditioning circuit 52, a temperature sensor circuit 66 and temperature signal conditioning 68, and an interconnect 70 for connecting to other lower sensor circuit board assemblies.

The local microprocessor 56 will perform the steps of scanning and reading the state of the reed switches upon receipt of a command from the master control microprocessor 36 on the top sensor circuit board assembly. A simplified flow chart of its operation is shown in FIG. 11. Upon receipt of command to Start 94, the buffer is parsed 96. A check 98 is made next to see if address data is received. If the check result is negative, the buffer is parsed again. Otherwise, the address data is checked for accuracy 100. If it is not the right address, the thermal data path is disabled 102 and the buffer is again parsed. When the address is found to be correct, the microprocessor proceeds to a) enable the thermal data path; b) scan the reed switch matrix and read switch status, and c) transmit the switch data to the top sensor circuit board assembly.

In the proposed invention electrical configuration, the number of conductive traces has been minimized to two. This has been achieved by using a RS-485 serial communication bus. Since only two conductive lines are carrying information, rather than the twenty-four or so lines presently used in prior art devices, the invention configuration will yield better noise immunity and better overall system reliability, as compared with prior art devices.

Each lower sensor circuit board assembly is terminated by an intelligent local controller, which determines the status of the rows of reed switches and reports this status to a master controller on the top sensor circuit board, using a universal digital word. This digital word is the same for all the circuit board assemblies: LIS sssssssss, where IS=assembly number in Hex, sssssssss=status of reed switches in one specified matrix.
The above method is simple and universal for a multitude of different applications. Device adaptation to diverse applications does not require dramatic software modification. For example, if the liquid level sensor device is to be configured to measure only liquid levels at the top and bottom of a tank, the prior art level sensor devices would require complete change of communication protocol, whereas the invention device would not. The invention device method can automatically address any combination of assemblies.

In addition to performing the functions of data collection from all assemblies and communicating the data to an external. computer or monitor, the master control microprocessor also determines the health status of the reed switches. It does this by utilizing an artificial intelligence and a fuzzy logic algorithm. The software algorithm statistically determines the rate of liquid change in the liquid vessel and, using a value of the rate of change, computes the prognosed liquid level for the next cycle of data acquisition. The master control compares the prognosed and actual liquid levels to determine the degree of probability of the next reed switch to be closed. Based on this criteria, the master control determines which switches are healthy and which switches are likely in default. Possible bad switches are looked at for two occurrences; switch closed and never open or switch open and never closed. A fault matrix is compounded from detected bad switches, giving the assembly location of the bad switches. This information can be used in maintenance and repair for identifying faulty assemblies and switches which need to be replaced.

In maintenance and repair, the invention mechanical fastening method and electrical connectors for the sensor circuit board assemblies provide an easy way of disconnecting the assemblies. The spacers separating the assemblies are removed after unscrewing and releasing the fastening screws. The electrical connectors are simply disengaged. There is no need to de-solder any electrical components. To access the internal assemblies for troubleshooting and repair or replacement, it is only necessary to remove the top cap of the device by unscrewing it. No special tools are required. Maintenance and repair of the device are thus greatly facilitated by the invention mechanical and electrical configuration.

In summary, the invention device is seen to have at least the following advantages over the presently available devices:

1. The invention reliability is much higher due to the device assembly mechanical and electrical connector design which prevents electrical component or contact breakage due to assembly bending, and also due to the minimum number of traces (two) used throughout.

2. Accuracy of level readings is greater, because of the methods of addressing the switches and determination of faulty switch locations.

3. Maintenance troubleshooting and repair/replacement of device subassemblies or parts is much easier than is the case for most presently available liquid level sensor devices, because the invention assemblies can be easily unscrewed and disconnected from each other.

4. The device adapts easily with little or no software modification to a multitude of diverse applications, including bottom and top level only measurements.

From the above description, it is clear that the preferred embodiment of the liquid level sensor device achieves the objects of the present invention. Alternative embodiments and various modifications may be apparent to those skilled in the art. These alternatives and modifications are considered to be within the spirit and scope of the present invention.

Having described the invention, what is claimed is:

1. A liquid level sensor device comprising in combination:
   (a) a tube, said tube being sealed at its bottom end and having an exterior threaded portion at its top end;
   (b) a cap member having an interior threaded portion sized to screw tightly over the top threaded portion of said tube;
   (c) a first means fop gripping wires, said first means being attached externally to near the top end of said tube;
   (d) a float member, having a substantially annular, cylindrical form and sized to fit slidingly over the outside diameter axis of said tube; said float member including a multiplicity of permanent magnets embedded in its periphery;
   (e) a second means for electrical conduction disposed inside said tube for providing electrical signal connection to a top sensor circuit assembly inside said tube and to externally located equipments through said first means;
   (f) a top sensor circuit assembly located inside said tube near said top end, comprising:
      an RS-485 serial communication bus; an interface connector for connecting said communication bus to said second means; a multiplicity of reed switches that are arranged in two lines along the length of said top sensor circuit assembly, said reed switches being staggered along the length of said lines so that the center-to-center distance between reed switches is approximately 0.5 inches;
      a third means for master control of said top sensor circuit assembly and all lower sensor circuit assemblies and for communication with an external computer, said third means including & first microcomputer following a predetermined program which includes procedures for detection of faulty reed switches as well as reed switch status data collection, said reed switches having their output signals connected input to said first microcomputer; and
      a fourth means for a power supply for all electrical circuits that are mounted on said top sensor circuit assembly; and
      an interconnect connector for transmitting and receiving signals to and from lower sensor circuit assemblies, said interconnect connector being connected to said third means for master control;
   (g) a multiplicity of lower sensor circuit assemblies located inside said tube below said top sensor circuit assembly, each lower sensor circuit assembly comprising:
      a first interconnect connector for input/output signal electrical connection to the next circuit assembly that is connected above said lower sensor circuit, assembly;
      a multiplicity of reed switches that are arranged in two lines along the length of said lower sensor circuit assembly, said reed switches being staggered along the length of said lines so that the center-to-center distance between reed switches is approximately 0.5 inches;
      a second microcomputer for reed switch status data collection, following a predetermined program, and being electrically connected to the output signals of said reed switches and to said first interconnect connector for input/output signals; and
      a fifth means for a power supply for all electrical circuits that are mounted on said lower sensor circuit assembly; and
      a second interconnect connector for input/output signals electrical connection to the next circuit assembly connected below said lower sensor circuit assembly; and
   (h) a sixth means for releasably connecting said sensor circuit assemblies by mechanical connection to each other, to permit bending of said sensor circuit assemblies at or near said mechanical connection without breakage of component parts;
      said float member moving up and down with the liquid level of the container in which said sensor device is immersed, and interacting magnetically with said reed switches to activate them;
      said first microcomputer, on said top sensor circuit assembly, initializing itself upon powering up, then reading its configuration data and scanning top sensor circuit reed switch and other sensor data, then polling each of the lower sensor circuit microcomputers in turn and receiving lower sensor circuit reed switch data, then communicating said reed switch data indicating a liquid level and any other sensor data obtained from all assemblies to an external computer over an RS-485 serial interface.

2. The liquid level sensor device according to claim 1 wherein said tube and said cap member are made of a fiberglass material, resistant to corrosive fluid environments.

3. The liquid level sensor device according to claim 1 wherein said float member is made of Nitrile rubber material which is resistant to corrosive fluid environments.

4. The liquid level sensor device according to claim 1 wherein said top sensor circuit assembly includes a thermal sensor and a temperature signal conditioning circuit; said thermal sensor being configured to make thermal conductive contact with the inside wall of said tube and to thereby conduct the temperature of the surrounding fluid to said temperature signal conditioning circuit, said temperature signal conditioning circuit having its output signal connected to said first microcomputer.

5. The liquid level sensor device according to claim 1 wherein said lower sensor circuit assembly includes a thermal sensor and a temperature signal conditioning circuit; said thermal sensor being configured to make thermal conductive contact with the inside wall of said tube and to thereby conduct the temperature of the surrounding fluid to said temperature signal conditioning circuit, said temperature signal conditioning circuit having its output signal connected to said second microcomputer.

6. The liquid level sensor device according to claim 1 wherein said sixth means for releasably connecting said sensor circuit assemblies by mechanics connection to each other, includes three sets of screw fasteners and insulator spacers for each end of a sensor circuit assembly, said screw fasteners and spacers being located near an end of a first sensor circuit assembly and arranged in an "L" configuration with two fasteners and spacers located across the width of said first sensor circuit assembly and nearest to the assembly end, and a single fastener and spacer being located at a short distance along the assembly length, away from the assembly end; each said screw fastener comprising a threaded screw and a threaded insert; each said threaded screw being inserted through a hole in said first sensor circuit assembly, through a spacer and through said threaded insert which is located in a hole in a second sensor circuit assembly which has its end overlapping the end of said first sensor circuit assembly; said spacers serving to keep said first and second sensor circuit assemblies rigidly separated by fixed space, so that; the fastened ends of said assemblies can not bend, and any bending will occur only just beyond the location of said single fastener and spacer; and wherein said interconnect connectors are located, one connector inside the assembly area held rigid by said screw fasteners and spacers, protecting said connector from bending forces.

7. A liquid level sensor device comprising in combination:
(a) a tube, said tube being sealed at its bottom end and having an exterior threaded portion at its top end;
(b) a cap member having an interior threaded portion sized to screw tightly over the top threaded portion of said tube;
(c) a first means for gripping wires, said first means being attached externally to near the top end of said tube;
(d) a float member, having a substantially annular, cylindrical form and sized to fit slidingly over the outside diameter axis of said tube; said float member including a multiplicity of permanent magnets embedded in its periphery;
(e) a second means for electrical conduction disposed inside said tube for providing electrical signal connection to a top sensor circuit assembly inside said tube and to externally located equipments through said first means; and
(f) a top sensor circuit assembly located inside said tube near said top end, comprising
an RS-485 serial communication bus; an interface connector for connecting said communication bus to said second means; a multiplicity of reed switches that are arranged in two lines along the length of said top sensor circuit assembly, said reed switches being staggered along the length of said lines so that the center-to-center distance between reed switches is approximately 0.5 inches;
a third means for master control of said top sensor circuit assembly and any lower sensor circuit assemblies and for communication with an external computer, said third means including a first microcomputer following a predetermined program which includes procedures for detection of faulty reed switches as well as reed switch status data collection, said reed switches having their output signals connected input to said first microcomputer; and
a fourth means for a power supply for all electrical circuits that are mounted on said top sensor circuit assembly;
said float member moving up and down with the liquid level of the container in which said sensor device is immersed, and interacting magnetically with said reed switches to activate them;
said first microcomputer, on said top sensor circuit assembly, initializing itself upon powering up, then reading its configuration data and scanning top sensor circuit reed switch and other sensor data, then communicating said reed switch data indicating a liquid level and any other sensor data obtained to an external computer over an RS-485 serial interface.

8. The liquid level sensor device according to claim 7 wherein said tube and said cap member are made of a fiberglass material, resistant to corrosive fluid environments.

9. The liquid level sensor device according to claim 7 wherein said float member is made of Nitrile rubber material which is resistant to corrosive fluid environments.

10. The liquid level sensor device according to claim 7 wherein said top sensor circuit assembly includes a thermal sensor and a temperature signal conditioning circuit; said thermal sensor being configured to make thermal conductive contact with the inside wall of said tube and to thereby conduct the temperature of the surrounding fluid to said temperature signal conditioning circuit, said temperature signal conditioning circuit having its output signal connected to said first microcomputer.

11. A liquid level sensor device comprising in combination:
a tube, said tube being sealed at its bottom end and having an exterior portion at its open top end prepared for sealing;
a cap member and seals to attach to the top end of said tube, sealing it tightly;
a first means for gripping wires, said first means being attached externally near said top end of said tube;
a second means for transmission of electrical signals, connected to said first means and disposed inside said tube;
a top sensor circuit assembly located inside said tube near said top end, comprising: a first circuit board, a first terminal connected to said second means, an RS-485 serial communication bus connected to said first terminal, a first microprocessor for master control of said top sensor circuit assembly and all lower sensor circuit assemblies, an RS-485 line driver circuit connected to said serial communication bus and to said first microprocessor, a multiplicity of magnetically sensitive switches arranged in two lines along the length of said first circuit board, said switches being located staggered along the length of said lines so that the center-to-center distance between switches is approximately 0.5 inches, said switches being connected to said first, microprocessor, a switch configuration circuit connected to the output signals of said magnetically sensitive switches and to said first microprocessor, a third means for a power supply for all electrical components mounted on said top sensor circuit assembly, and a second input/output terminal connected to said first microprocessor for transmitting and receiving signals from lower sensor circuit assemblies;

a multiplicity of lower sensor circuit assemblies located inside said tube below said top sensor circuit assembly, each lower sensor circuit assembly comprising: a second circuit board, a third input/output terminal for connection to an input/output terminal on a sensor circuit assembly rotated above, a second microprocessor for control of all circuits on said lower sensor circuit assembly, a multiplicity of magnetically sensitive switches arranged in two lines along the length of said second circuit board, said switches being located staggered along the length of said lines so that the center-to-center distance between switches is approximately 0.5 inches, said switches being connected to said second microprocessor, a fourth means for a power supply for all electrical components that are mounted on said lower sensor circuit assembly, and a fourth input/output terminal connected to said second microprocessor and for connection to any sensor circuit assemblies located below said lower sensor circuit assembly;

a fifth means for releasably connecting said upper and lower sensor circuit assemblies by mechanical connection to each other, holding the joint area rigidly and permitting application of bending forces without incurring component damage; and a float member, having a substantially annular form and sized to fit slidingly over the circumference of said tube said float member including a multiplicity of permanent magnets embedded in its periphery;

said float member moving up and down with the liquid level of the container in which said sensor device is immersed, and interacting magnetically with said magnetically sensitive switches to activate them;

said first microcomputer, on said top sensor circuit assembly, initializing itself upon powering up, then reading its configuration data and scanning top sensor circuit switch and other sensor data, then polling each of the lower sensor circuit microcomputers in turn and receiving lower sensor circuit switch data, then communicating said switch data indicating a liquid level and any other sensor data obtained from all assemblies to an external computer over an RS-485 serial interface.

12. The liquid level sensor device according to claim 11 wherein said tube and said cap member are made of a fiberglass material, resistant to corrosive fluid environments.

13. The liquid level sensor device according to claim 11 wherein said float member is made of Nitrile rubber material which is resistant to corrosive fluid environments.

14. The liquid level sensor device according to claim 11 wherein said top sensor circuit assembly includes a thermal sensor and a temperature signal conditioning circuit; said thermal sensor being configured to make thermal conductive contact with the inside wall of said tube and to thereby conduct the temperature of the surrounding fluid to said temperature signal conditioning circuit, said temperature signal conditioning circuit having its output signal connected to said first microcomputer.

15. The liquid level sensor device according to claim 11 wherein said lower sensor circuit assembly includes a thermal sensor and a temperature signal conditioning circuit; said thermal sensor being configured to make thermal conductive contact with the inside wall of said tube and to thereby conduct the temperature of the surrounding fluid to said temperature signal conditioning circuit, said temperature signal conditioning circuit having its output, signal connected to said second microcomputer.

16. The liquid level sensor device according to claim 11 wherein said fifth means for releasably connecting said sensor circuit assemblies by mechanical connection to each other, includes three sets of screw fasteners and insulator spacers for each end of a sensor circuit assembly, said screw fasteners and spacers being located near an end of a first sensor circuit assembly and arranged in an "L" configuration with two fasteners and spacers located across the width of said first sensor circuit assembly and nearest to the assembly end, and s single fastener and spacer being located at a short distance along the assembly length, away from the assembly end; each said screw fastener comprising a threaded screw and a threaded insert; each said threaded screw being inserted through a hole in said first sensor circuit assembly, through a spacer and through said threaded insert which is located in a hole in a second sensor circuit assembly which has its end overlapping the end of said first sensor circuit assembly; said spacers serving to keep said first and second sensor circuit assemblies rigidly separated by a fixed space, so that the fastened ends of said assemblies can not bend, and any bending will occur only just beyond the location of said single fastener and spacer; and wherein said interconnect connectors are located, one connector inside the assembly area held rigid by said screw fasteners and spacers, protecting said connector from bending forces.

* * * * *